United States Patent Office 3,365,425
Patented Jan. 23, 1968

3,365,425
RANDOM LINEAR COPOLYESTERS OF ASYMMETRICALLY SUBSTITUTED PHTHALIC ACIDS
William H. Watson, Grifton, N.C., assignor to E. I. du Pont de Nemours and Company, Wilmington, Del., a corporation of Delaware
No Drawing. Filed Apr. 12, 1965, Ser. No. 447,512
3 Claims. (Cl. 260—75)

ABSTRACT OF THE DISCLOSURE

A linear random copolyester consisting essentially of the condensation copolymer of ethylene glycol with a mixture of 70 to 90 mole percent of bibenzoic acid and 30 to 10 mole percent of a bulky, asymmetrically substituted phthalic acid selected from the group consisting of 2,5-diphenylterephthalic acid, 4,6-diphenylisophthalic acid and 5-tert-butyl-isophthalic acid. Also disclosed are fibers and yarns of the above copolyesters having good recovery properties.

---

This invention relates to a novel class of copolyesters, and to fibers, films and other shaped articles prepared therefrom.

Fibers of synthetic polyesters have achieved wide commercial usage in a great variety of applications because of a particularly advantageous combination of physical properties. Frequently, however, it has been desired to improve one or more of these properties to gain superior performance in certain applications. The search for superior polyesters has included an examination of the polyesters and copolyesters of bibenzoic acid. However, this work has generally not been fruitful because polyesters of bibenzoic acid and a glycol (e.g., polyethylene bibenzoate) are extremely high melting and have high rates of crystallization, making the preparation of useful articles from them extremely difficult and costly.

In accordance with the present invention, novel copolyesters of bibenzoic acid have been found with melting points and rates of crystallization suitable for the formation of fibers, films and other useful shaped articles.

The novel copolyesters of this invention are linear condensation copolymers of ethylene glycol with a mixture of 70–90 mole percent bibenzoic acid and 30–10 mole percent of a bulky, asymmetrically substituted phthalic acid selected from the group consisting of 2,5-diphenyl terephthalic acid, 4,6-diphenylisophthalic acid, and 5-tert-butyl-isophthalic acid. In fiber form these copolyesters will have an intrinsic viscosity of at least 0.3, as measured in solution at 25° C. in methylene chloride (80%)-trifluoracetic acid (20%) (solvent). The invention, however, also contemplates films and other shaped articles prepared from these novel copolyesters.

The novel polymers of the invention may alternatively be characterized as linear random copolyesters having recurring units consisting essentially of those represented by the formulas:

I.

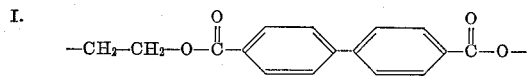

and

II.

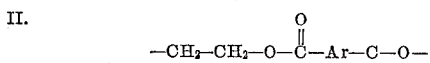

where Ar is a bulky, unsymmetrically substituted phenylene radical of the group consisting of

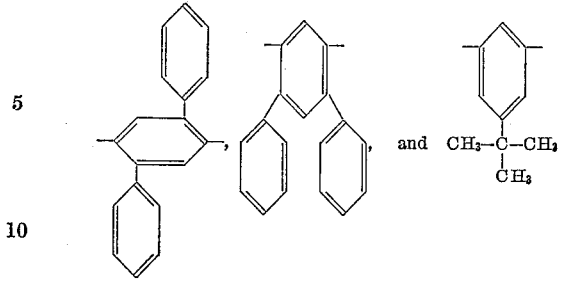

and wherein the ratio of the units I/II is within the range 70/30 to 90/10.

The copolyesters in this group are generally stable to conditions used in commercial melt polymerization and spinning techniques, have melting points suitable for melt spinning, and have rates of crystallization which enable them to be readily quenched to form drawable fibers suitable for textile purposes. The fibers are characterized by a high degree of recovery from low tensile strain, a property particularly desired in fibers used in the preparation of wash-and-wear fabrics.

The novel copolyesters of the invention are preferably formed from a mixture of monomeric components including ethylene glycol and a mixture of 70–90 mole percent dimethyl bibenzoate with 30–10 mole percent of a dimethyl ester of an acid from the group consisting of 2,5 - diphenylterephthalic acid, 4,6 - diphenylisophthalic acid, and 5-tert-butylisophthalic acid. Other lower alkyl esters, phenylesters, etc., of the acid may be used in place of the dimethyl ester. The reaction is usually carried out with the assistance of an ester interchange catalyst such as manganous acetate, zinc acetate, calcium acetate, or sodium methoxide. The ester interchange reaction is followed by polycondensation at high temperature and low partial pressure of the glycol until a polymer of the desired molecular weight is produced. Alternatively, the bis glycol esters of the acids may be conveniently formed first and then reacted in the desired mole percentages using a polymerization catalyst such as antimony trioxide, litharge, and the tetralkyl titanates, e.g., tetraisopropyl titanate. Similarly, other equivalent methods such as using ethylene oxide in the place of ethylene glycol may be employed so long as the end product copolyester has the composition indicated above.

Alternatively the copolyesters may be formed from ethylene glycol and the acid chlorides of the dicarboxylic acids.

Part of the ethylene glycol may be replaced by other suitable glycols in minor amounts, i.e., up to about 10 mole percent. Examples of suitable glycols include the polymethylene glycols, such as propylene glycol, tetramethylene glycol, hexamethylene glycol, and decamethylene glycol as well as the branched chain glycols, such as 2,2 - dimethyl - 1,3 - propanediol and 2,2 - dimethyl - 1,4-butanediol. Other suitable glycols include cis- and trans-p-hexahydroxylylene glycol, bis-p-(2-hydroxyethyl)-benzene, diethylene glycol, bis-(4-hydroxybutyl)ether, bis-1,4-(2-hydroxyethoxy)-benzene, and triethylene glycol. Mixtures of the glycols may be used.

The expression "polymer melting temperature" employed with respect to the products of this invention is the minimum temperature at which a sample of the polymer leaves a wet molten trail as it is stroked with moderate pressure across a smooth surface of the heated metal. "Polymer melting temperature," abbreviated PMT, has sometimes in the past been referred to as "polymer stick temperature."

The term "intrinsic viscosity," as used herein, is defined as the limit of the fraction $$\frac{\ln(r)}{c}$$

as $c$ approaches zero, where $(r)$ is the relative viscosity, and $c$ is the concentration in grams per 100 ml. of solution. The relative viscosity $(r)$ is the ratio of the viscosity of a solution of the polymer in a mixture of 80 parts methylene chloride and 20 parts trifluoracetic acid (by volume) to the viscosity of the methylene chloride/trifluoracetic acid mixture, per se, measured in the same units at 25° C. Intrinsic viscosity, symbol $[\eta]$, is a measure of the degree of polymerization.

In the examples, values of tenacity in g.p.d., elongation in percent, and initial modulus in g.p.d. (all expressed as "T/E/Mi") are determined upon polyester fibers which have been spun and drawn as indicated. Measurements are made before and after a mock finishing procedure which comprises the consecutive steps of:

(a) heat treating the filaments by boiling them in water for 15 minutes while allowing 3% shrinkage in length, (b) heating the filaments in an oven at 180° C. for 3 minutes, again allowing 3% shrinkage in length, (c) heat treating the filaments by boiling them in water for 15 minutes while allowing 1% shrinkage in length, and finally (d) air drying the filaments.

This invention is further illustrated, but it is not intended to be limited, by the following examples in which parts and percentages are by weight unless otherwise specified.

EXAMPLE I

Prepaartion of the dimethyl ester of 2,5-diphenylterephthalic acid of the formula:

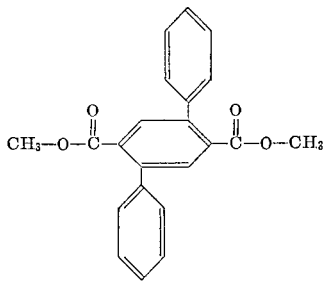

(a) *Preparation of 2,5-dicyclohexyl-p-xylene*

A mixture of 106 grams p-xylene, 200 ml. cyclohexane and 20 grams $AlCl_3$ is cooled to 5° C. and 164 grams cyclohexane is added with stirring. The addition is carried out over a period of 5 hours during which the temperature is held below 9° C. After the addition, the mixture is stirred an additional 7 hours at a temperature below 10° C., and then finally stirred for 10 hours at 20° C. To the mixture is then added 500 ml. of methanol-HCl (4:1) and the pasty product which separates is collected. The solid product is recrystallized from 2 liters of benzene-ethanol (1:1), cooling only to room temperature. The product is washed twice with methanol to yield 166.5 grams of product having a melting point of 155°–156° C. [previously reported M.P. 152°–154° C. Chem Ber 89, 2194 (1956)].

(b) *Preparation of 2',5'-dimethyl-p-terphenyl*

To 140 grams of 2,5-dicyclohexyl-p-xylene, prepared above, is added 45 grams of 5% Pd-C catalyst and the mixture heated with stirring at 280°–290° C. until evolution of hydrogen ceases. The molten mixture is cooled, pulverized, and extracted with ethyl acetate using a Soxhlet extractor. The extract is cooled to room temperature and the solid product collected. The procedure yields 99.5 grams of solid having a melting point of 185°–187° C.

(c) *Preparation of the dimethyl ester of 2,5-diphenylterephthalic acid*

A solution of 2000 ml. pyridine, 200 ml. water and 86 grams 2',5'-dimethyl-p-terphenyl, prepared above, is heated to reflux with stirring, and then a suspension of 264 grams $KMnO_4$ in 1670 ml. of water is added portionwise. After several hours refluxing, the permanganate color fades and additional permanganate is added until the color is permanent. The mixture is filtered and the filtrate acidified. The precipitate is collected and then washed 3 times in water, and dried to give 99.5 grams of product having a melting point of 297° C. The measured neutral equivalent is 162.1 (theoretical: 157).

The diacid prepared above is converted to the acid chloride by refluxing with an excess $SOCl_2$ containing a small amount of pyridine as a catalyst. The excess $SOCl_2$ is then removed and the product treated with anhydrous methanol. After the methanol mixture is refluxed for several hours, one liter of toluene is added and the mixture distilled until the boiling point rises to 110° C., the solution is then cooled to 5° C., the product collected, dried, and triturated with dilute sodium bicarbonate solution. The product is then recrystallized from methanol-dioxane (1:5) to give 152.5 grams of ester melting at 186°–188° C.

EXAMPLE II

Preparation of the dimethyl ester of 4,6-diphenylisophthalic acid of the formula:

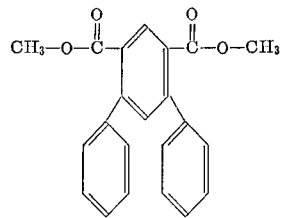

(a) *Preparation of 4,6-dicyclohexyl-m-xylene*

A mixture of 123 grams m-xylene, 200 ml. cyclohexane and 20 grams $AlCl_3$ is cooled to −3.5° C. and 202 ml. cyclohexene is added with stirring. The addition is carried out over a period of 3 hours during which the temperature is held below 0° C. After the addition, the mixture is stirred an additional 3 hours. To the mixture is then added 500 ml. of methanol-HCl (4:1) and, after stirring for 20–30 minutes, 500 ml. benzene and 400 ml. $H_2O$ is added. The organic layer is separated and washed three times with water. The solution is dried by distillation and then cooled in ice. The solid product is recrystallized from 0.4 liter of benzene-ethanol (1:1), cooling only to room temperature. The product weighs 121 grams and melts at 107°–108° C.

(b) *Preparation of 4',6'-dimethyl-m-terphenyl*

To 135 grams of 4,6-dicyclohexyl-m-xylene, prepared as above, is added 43 grams of 5% Pd-C catalyst and the mixture heated with stirring at 300° C. until evolution of hydrogen ceases. The molten mixture is cooled, poured into ethyl acetate, and the catalyst removed by filtration. The ehtyl acetate was removed by distillation and the residual oil crystallized from ethanol. The procedure yields 100 grams of solid having a melting point of 66°–68° C.

(c) *Preparation of dimethyl ester of 4,6-diphenylisophthalic acid*

A solution of 200 ml. pyridine, 200 ml. water and 86 grams 4',6'-dimethyl-m-terphenyl, prepared above, is heated to reflux with stirring, and then a suspension of 264 grams $KMnO_4$ in 1670 ml. of water is added portionwise. After several hours refluxing, the permanganate color fades and additional permanganate is added until the color is permanent. The mixture is filtered and the filtrate acidified. The precipitate is collected and then washed 3 times in water, and dried to give 70 grams of product having a melting point of 185°–195° C. After recrystallization from aqueous acetic acid the measured neutral equivalent is 159.5 (theoretical: 159).

The diacid prepared above is converted to the acid chloride by refluxing with an excess SOCl$_2$ containing a small amount of pyridine as a catalyst. The excess SOCl$_2$ is then removed and the product treated with anhydrous methanol. After the methanol mixture is refluxed for several hours, one liter of toluene is added and the mixture distilled until the boiling point rises to 110° C., the solution is then cooled to 5° C., the product collected, dried, and triturated with dilute sodium bicarbonate solution. The product is then recrystallized from methanol-dioxane (1:5) to give 42 grams of ester melting at 109°–111° C.

EXAMPLE III

Preparation of the dimethyl ester of 5-tert-butyl-isophthalic acid of the formula:

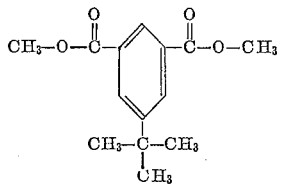

To 200 grams of purified 5-tert-butylisophthalic acid is added 1.5 liters methanol saturated with HCl. The mixture is heated to reflux temperature and held for 4 hours, and then poured into 2 liters of water whereupon the dimethyl ester separates as a white powder. The product is recrystallized from methanol giving 193 grams of diester having a melting point of 100.3°–100.8° C. and a saponification equivalent of 124.2 (theoretical: 125.1).

EXAMPLE IV

*Polyethylene bibenzoate/diphenylterephthalate, 80/20 mole percent*

A distillation vessel is charged with:
Ethylene glycol—15.6 grams, .25 mole
Dimethylbibenzoate—21.6 grams, 0.08 mole
Dimethyl ester of 2,5-diphenylterephthalic acid—7.5 grams, 0.02 mole
Manganous acetate—8.0 milligrams The vessel is heated slowly until all of the methanol and part of the excess glycol is removed by distillation. Then the hot mixture ("monomer") is transferred to a polymerization vessel fitted with a vacuum connection along with 0.005 gram of Sb$_2$O$_3$. The mixture is stirred while the temperature is raised to 310° C. and the pressure slowly reduced to 0.9 millimeter of mercury. After 1.3 hours the product is found to have a polymer melting temperature of 265° C. and an intrinsic viscosity of 0.43. Fibers can be drawn from the melt. The melt is cooled, pulverized and heated at 220° C. and 1.6 mm. Hg pressure for 18 hours. The intrinsic viscosity increased to 0.62.

The polymer is melt-spun at 335° C., quenched in air and then drawn 4.3X at a drawing temperature of 142° C. to give fibers having a tenacity of 2.3 g.p.d., a break elongation of 16% and an initial modulus of 118 g.p.d. The fibers are mock finished as previously described, following which the tenacity is found to be 2.2 g.p.d., the break elongation 28%, and the initial modulus 74 g.p.d. Measurement of tensile recovery gives a TSR value of 72.

The TSR value of 72 is more fully appreciated when it is realized that commercial fibers of polyethylene terephthalate tested in the same test, give TSR values of only 64–67.

EXAMPLE V

The general procedure of Example IV is repeated with the exception that different ratios of the two acid components are used. Polymers are prepared and melt-spun to give yarns having the properties in Table 1 below. TSR is measured after mock finishing.

TABLE 1

| Acid Ratio BB/DPT | PMT, ° C. | Spinning Temp., ° C. | Yarn [η] | Draw Ratio | Draw Temp., ° C. | T/E/Mi, g.p.d./percent/g.p.d. | TSR |
|---|---|---|---|---|---|---|---|
| 85/15 | 295 | 350 | 0.66 | 3.9 | 157 | 2.9/21/102 | 71 |
| 75/25 | 255 | 345 | 0.66 | 3.7 | 120 | 3.1/20/108 | 72 |
| 70/30 | 225 | 330 | 0.63 | 3.9 | 120 | 2.7/17/92 | 69 |

BB=Bibenzoic acid. DPT=Diphenylterephthalic acid.

EXAMPLE VI

*Polyethylene bibenzoate/diphenylisophthalate, 80/20 mole percent*

A reaction vessel is charged with:
Ethylene glycol—31.3 grams, 0.5 mole
Dimethyl bibenzoate—64.8 grams, 0.24 mole
Dimethyl ester of 4,6-diphenylisophthalic acid—24.4 grams, 0.06 mole
Manganous acetate—22 milligrams
Antimony oxide—14 milligrams The vessel is heated until all of the methanol and part of the excess glycol is removed by distillation. Then the temperature of the mixture is raised to 300° C. and the pressure reduced to 0.9 millimeter of mercury. After 0.5 hour, the product is found to have a polymer melting temperature of 273° C. and an intrinsic viscosity of 0.82. Fibers and films can be formed from the melt.

The polymer is melt-spun at 345° C., quenched in air, and then drawn 3.7X over a draw pin heated to 120° C. The fibers produced have a tenacity of 2.5 g.p.d., a break elongation of 19% and an initial modulus of 94 g.p.d.

The low rate of crystallization of the polymer is shown by the fact that when immersed in boiling water for 5 minutes the drawn yarn undergoes a shrinkage of 37.7%.

The fibers are mock finished as previously described following which the tenacity is found to be 2.0 g.p.d., the break elongation 40% and the initial modulus 73 g.p.d. Measurement of tensile recovery gives a TSR value of 71.

EXAMPLE VII

*Polyethylene bibenzoate/t-butylisophthalate*

Two polymer batches are prepared using the following compositions as starting material:

Polymer charge A (bibenzoate/t-butylisophthalate, 80/20):

| | |
|---|---|
| Ethylene glycol | 8 lbs. 13 oz. |
| Dimethyl bibenzoate | 4374 g. |
| Dimethyl ester of t-butylisophthalate | 1001 g. |
| Manganous acetate | 1.95 g. |
| Antimony oxide | 1.30 g. |

Polymer charge B (bibenzoate/t-butylisophthalate, 75/25):

| | |
|---|---|
| Ethylene glycol | 8 lbs. 13 oz. |
| Dimethyl bibenzoate | 4374 g. |
| Dimethyl ester of t-butylisophthalate | 1350 g. |
| Manganous acetate | 1.95 g. |
| Antimony oxide | 1.30 g. |

In preparing each of these polymers, the initial charge is placed in a distillation vessel and heated until the ester exchange reaction is complete and all of the methanol is removed. The mixture is then transferred to a stirred polymerization vessel, and the temperature raised to 320° C. and the pressure reduced to 0.8–1.3 millimeters of mercury. Polymerization is continued for 1 hour and then the molten polymer is extruded as a ribbon, solidified, and cut to flake. Polymer A is found to have an intrinsic viscosity of 0.65. Polymer B has an average intrinsic viscosity of about 0.61.

The two polymers are melt-spun, quenched in air, and drawn using the conditions summarized in the table below. The properties of the yarn are also presented in the table. The TSR values presented are measured after a mock finishing procedure, described previously.

mined from the graph by usual graphical averaging procedures. High TSR values are characteristic of fibers which form wrinkle-resistant fabrics. A more extensive discussion of TSR will be found in an article W. W. Daniels, Textile Research Journal, 30, 656 (1960).

Since many different embodiments of the invention may be made without departing from the spirit and scope thereof, it is to be understood that the invention is not limited by the specific illustrations except to the extent defined in the following claims.

TABLE 2

|  | Spinning Conditions | | Spun Yarn | | | Drawing Conditions | | Yarn Properties | | | |
| --- | --- | --- | --- | --- | --- | --- | --- | --- | --- | --- | --- |
|  | Spinning Block Temperature | Spinning Speed (y.p.m.) | Spun Denier | Number of Filaments | Intrinsic Viscosity | Draw Ratio | Drawing Temp. | Tenacity | Elongation | Mi | TSR |
| Polymer A | 320 | 500 | 260 | 33 | .49 | 3.0 | 120 | 2.79 | 14.9 | 131 | 67.3 |
| Polymer B | 305 | 500 | 271 | 34 | .55 | 3.31 | 112 | 2.42 | 27.8 | 95 | 61.0 |

EXAMPLE VIII

The general procedure of Example IV is repeated to prepare polyethylene bibenzoate/t-butylisophthalate copolymers having various ratios of bibenzoate/t-butylisophthalate units. Polymers are prepared and melt-spun to give yarns having the properties shown in the table below.

TABLE 3

| Acid Ratio BB/t-BuI | PMT, ° C. | Spinning Temp., ° C. | Yarn [η] | Draw Ratio | Draw Temp., ° C. | T/E/Mi, g.p.d./percent/g.p.d. | TSR |
| --- | --- | --- | --- | --- | --- | --- | --- |
| 85/15 | 311 | 350 | ------ | 2.1 | 160 | 2.3/23/94 | 66 |
| 80/20 | 293 | 340 | 0.58 | 3.6 | 110 | 2.3/23/104 | 66 |
| 75/25 | 253 | 350 | 0.78 | 3.1 | 118 | ---------- | 55 |
| 70/30 | 241 | 335 | 0.63 | 4.1 | 120 | ---------- | 64 |

BB=Bibenzoic acid. t-BuI=tert.-butylisophthalic acid.

The TSR of a yarn sample is determined by mounting a 10-inch length of the yarn on a tensile tester with recording chart (commercially available from the Instron Engineering Corporation, Quincy, Mass.) and also equipped with a circulating water bath which can be raised and lowered. The water bath, maintained at 40° C., is raised to immerse the yarn. After the yarn has been immersed for 2 minutes without tension it is stretched, in the water bath, at an elongation rate of 1 inch per minute. Upon reaching the desired total elongation, the sample is held at constant length for an additional 2 minutes and the water bath is removed. The load on the yarn is then reduced to a value of 0.042 g.p.d. and the yarn is allowed to retract. Percent recovery is calculated from the formula:

$$\frac{\text{units of retraction}}{\text{units of elongation}} \times 100$$

This procedure is carried out for elongations of 0.5, 1, 2 and 3%, and a graph is prepared by plotting the percent recovery against total elongation in the range 0–3%. TSR values are average percent recovery values from the range 0–3% elongation which may be deter-

I claim:

1. A linear random copolyester consisting essentially of the condensation copolymer of ethylene glycol with a mixture of 70 to 90 mole percent of bibenzoic acid and 30 to 10 mole percent of a bulky, asymmetrically substituted phthalic acid selected from the group consisting of 2,5-diphenylterephthalic acid, 4,6-diphenylisophthalic acid and 5-tert-butyl-isophthalic acid.

2. Fibers of the copolyester defined in claim 1 having an intrinsic viscosity of at least 0.3, the intrinsic viscosity being determined for a 25° C. solution of the copolyester in 80% methylene chloride-20% trifluoroacetic acid solvent.

3. Yarn of a linear condensation copolyester of ethylene glycol with a mixture of 90 to 70 mole percent of bibenzoic acid and 10 to 30 mole percent of a bulky, asymmetrically substituted phthalic acid selected from the group consisting of 2,5-diphenylterephthalic acid, 4,6-diphenylisophthalic acid and 5-tert-butyl-isophthalic acid, having a polymer melting temperature of 225° to 311° C., the yarn having a tenacity of at least 2 grams per denier and a TSR value of about 55 to 72.

References Cited

UNITED STATES PATENTS 3,265,762    8/1966    Quisenberry _____ 260—75

WILLIAM H. SHORT, *Primary Examiner.*

R. T. LYON, *Assistant Examiner.*